(12) United States Patent
Tsukamoto et al.

(10) Patent No.: US 11,208,040 B2
(45) Date of Patent: Dec. 28, 2021

(54) DISPLAY SYSTEM AND WORK VEHICLE

(71) Applicant: KOMATSU LTD., Tokyo (JP)

(72) Inventors: Takashi Tsukamoto, Tokyo (JP); Etsuo Fujita, Tokyo (JP); Sueyoshi Nishimine, Tokyo (JP); Masahiro Ikeda, Tokyo (JP); Koji Okuda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/758,025

(22) PCT Filed: Oct. 6, 2016

(86) PCT No.: PCT/JP2016/079833
§ 371 (c)(1),
(2) Date: Mar. 7, 2018

(87) PCT Pub. No.: WO2017/068992
PCT Pub. Date: Apr. 27, 2017

(65) Prior Publication Data
US 2018/0244201 A1 Aug. 30, 2018

(30) Foreign Application Priority Data

Oct. 23, 2015 (JP) .............................. JP2015-208910

(51) Int. Cl.
*B60R 1/02* (2006.01)
*H04N 7/18* (2006.01)
(Continued)

(52) U.S. Cl.
CPC .................. *B60R 1/02* (2013.01); *B60R 1/10* (2013.01); *E02F 3/76* (2013.01); *E02F 3/7604* (2013.01);
(Continued)

(58) Field of Classification Search
CPC . H04N 7/181; G09G 5/14; B60R 1/02; B60R 2300/105; E02F 3/76
See application file for complete search history.

(56) References Cited

U.S. PATENT DOCUMENTS

| 8,843,279 B2 * | 9/2014 | Tafazoli Bilandi ..... E02F 9/264 701/50 |
| 2013/0182066 A1 * | 7/2013 | Ishimoto .................. E02F 9/261 348/38 |

(Continued)

FOREIGN PATENT DOCUMENTS

| JP | H07-20354 U | 4/1995 |
| JP | H11-217853 A | 8/1999 |

(Continued)

*Primary Examiner* — Tsion B Owens
(74) *Attorney, Agent, or Firm* — Faegre Drinker Biddle & Reath LLP

(57) ABSTRACT

Provided is a display system, which makes it easy for an operator to accurately grasp a traveling situation of a work vehicle. A front camera captures an excavating blade and topography in front of a crawler dozer. A rear camera captures a fuel tank and a ripper apparatus, and a topography behind the crawler dozer. A display image displayed on a monitor is generated by arranging a front image captured by the front camera and a rear image captured by the rear camera so that the excavating blade in the front image may face the fuel tank in the rear image.

5 Claims, 8 Drawing Sheets

(51) Int. Cl.
*E02F 3/76* (2006.01)
*G09G 5/14* (2006.01)
*G09G 5/00* (2006.01)
*E02F 5/32* (2006.01)
*E02F 9/26* (2006.01)
*G06F 3/147* (2006.01)
*B60R 1/10* (2006.01)

(52) U.S. Cl.
CPC ............... *E02F 5/32* (2013.01); *E02F 9/261* (2013.01); *E02F 9/264* (2013.01); *G06F 3/147* (2013.01); *G09G 5/00* (2013.01); *G09G 5/14* (2013.01); *H04N 7/18* (2013.01); *H04N 7/181* (2013.01); *B60R 2300/105* (2013.01)

(56) References Cited

U.S. PATENT DOCUMENTS

| | | | | |
|---|---|---|---|---|
| 2014/0088824 | A1* | 3/2014 | Ishimoto | B60R 1/00 |
| | | | | 701/34.4 |
| 2014/0354813 | A1 | 12/2014 | Ishimoto | |
| 2014/0375814 | A1* | 12/2014 | Ishimoto | E02F 9/24 |
| | | | | 348/148 |
| 2015/0085126 | A1 | 3/2015 | Avnery | |
| 2015/0130942 | A1 | 5/2015 | Fujita et al. | |
| 2015/0368881 | A1* | 12/2015 | Baeumchen | E02F 3/32 |
| | | | | 348/148 |
| 2016/0217331 | A1* | 7/2016 | Kowatari | B60R 1/00 |
| 2017/0036602 | A1* | 2/2017 | Kroll | E02F 3/188 |

FOREIGN PATENT DOCUMENTS

| | | |
|---|---|---|
| JP | 2000-272415 A | 10/2000 |
| JP | 2001-140286 A | 5/2001 |
| JP | 2006-219894 A | 8/2006 |
| JP | 2006-290186 A | 10/2006 |
| JP | 2009-113561 A | 5/2009 |
| JP | 2010-059653 A | 3/2010 |
| JP | 2011-009823 A | 1/2011 |
| JP | 2011-062115 A | 3/2011 |
| JP | 2013-253397 A | 12/2013 |
| WO | WO 2013/105597 A1 | 7/2013 |
| WO | WO-2013/175753 A1 | 11/2013 |

* cited by examiner

DISPLAY SYSTEM AND WORK VEHICLE

TECHNICAL FIELD

The present invention relates to a display system and a work vehicle.

BACKGROUND ART

Heretofore, a technique has been proposed, in which, in order to make it easy for an operator to grasp a sense in a left/right direction of a vehicle body of a work vehicle when an image on a rear side of the vehicle body is displayed on a monitor device, the rear side of the vehicle body is displayed as a mirror image, and a left/right direction on the image and the left/right direction of the vehicle body are allowed to coincide with each other (for example, see Japanese Patent Laying-Open No. 2001-140286 (PTD 1).

CITATION LIST

Patent Document

PTD 1: Japanese Patent Laying-Open No. 2001-140286

SUMMARY OF INVENTION

Technical Problems

Such a work vehicle as a crawler dozer sometimes performs work by repeating forward and reverse at a work site. In such a case, since a frequency of switching between the forward and the reverse is high, it is desirable that both an image ahead of the work vehicle and an image behind the work vehicle be simultaneously displayed on a display apparatus that displays surrounding situation of the work vehicle.

However, even if both the image ahead of the work vehicle and the image behind the work vehicle are simultaneously displayed on the display apparatus, it has been difficult for an operator who views the two images at the same time to accurately grasp a traveling situation of the work vehicle during traveling of the work vehicle, especially during turning of the work vehicle.

Therefore, it is a principal object of the present invention to provide a display system that makes it easy for an operator to accurately grasp a traveling situation of a work vehicle.

Solution to Problems

The inventors of the present invention have studied a display apparatus that displays an image ahead of a work vehicle and an image behind the work vehicle in a line so that an operator can visually recognize both of the two images with less movement of a line of sight. As a result, the inventors of the present invention have found that, when the image ahead of the work vehicle and the image behind the work vehicle are displayed in a line, it is difficult for the operator to grasp a traveling situation of the work vehicle if a direction in which a ground in front of the work vehicle moves following traveling of the work vehicle is opposite to a direction in which the ground behind the work vehicle moves following the traveling, and then have completed the present invention.

That is, a display system according to the present invention includes: a front imaging unit, a rear imaging unit, an image generating unit, and a display unit. The front imaging unit captures a front portion of a work vehicle and a topography in front of the work vehicle. The rear imaging unit captures a rear portion of the work vehicle and a topography behind the work vehicle. The image generating unit generates a display image. The display image is generated by arranging the front image captured by the front imaging unit and the rear image captured by the rear imaging unit so that the front portion of the work vehicle in the front image may face the rear portion of the work vehicle in the rear image. The display unit displays the display image.

In the above-described display system, the front image and the rear image are arranged in an up-and-down direction of the display image.

In the above-described display system, of the front image and the rear image, which are arranged in the up-and-down direction of the display image, a lower image in the up-and-down direction of the display image is a normal image in an upside-down direction.

In the above-described display system, the front image and the rear image are arranged with the front image up and the rear image down in the up-and-down direction of the display image.

In the above-described display system, scales of the front portion of the work vehicle in the front image and the rear portion of the work vehicle in the rear image are equal to each other.

In the above-described display system, the front image and the rear image are arranged adjacent to each other.

A work vehicle according to the present invention includes: a vehicle main body; a front imaging unit; and a rear imaging unit. The front imaging unit and the rear imaging unit are mounted on the vehicle main body. The front imaging unit captures a front portion of the work vehicle and a topography in front of the work vehicle. The rear imaging unit captures the rear portion of the work vehicle and the topography behind the work vehicle. One of the front imaging unit and the rear imaging unit is attached to the vehicle main body in an upside-down direction. The other of the front imaging unit and the rear imaging unit is attached to the vehicle main body in an upside-up direction.

In the above-described work vehicle, the front imaging unit is attached to the vehicle main body in the upside-up direction, and the rear imaging unit is attached to the vehicle main body in the upside-down direction.

A display system according to the present invention includes: a front imaging unit, a rear imaging unit, an image generating unit, and a display unit. The front imaging unit captures a front of a work vehicle. The rear imaging unit captures a rear of the work vehicle. The image generating unit generates a display image. The display image is generated by arranging a front image captured by the front imaging unit and an image obtained by rotating a rear image captured by the rear imaging unit by 180°. The display unit displays the display image.

In the above-described display system, the front image includes a front portion of the work vehicle and a topography in front of the work vehicle. The rear image includes a rear portion of the work vehicle and a topography behind the work vehicle.

Advantageous Effects of Invention

In accordance with the display system of the present invention, it is made easy for an operator to accurately grasp traveling situation of a work vehicle.

DESCRIPTION OF EMBODIMENTS

An embodiment of the present invention will be described hereinafter with reference to the drawings.

First, a construction of a crawler dozer which is an example of a work vehicle to which the concept of the present invention is applicable will be described.

Figure 1:
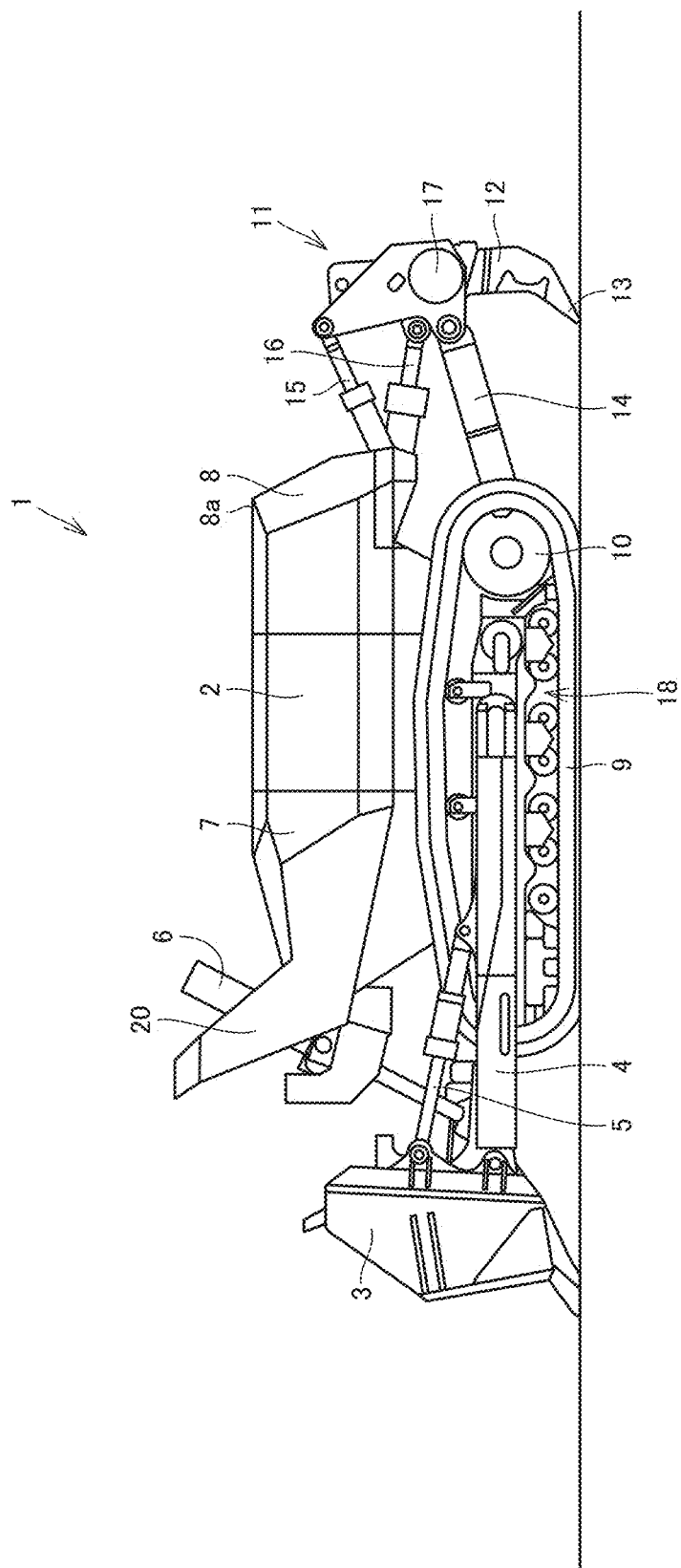
FIG. 1 is a side view schematically showing a construction of a crawler dozer in an embodiment of the present invention.
Figure 2:
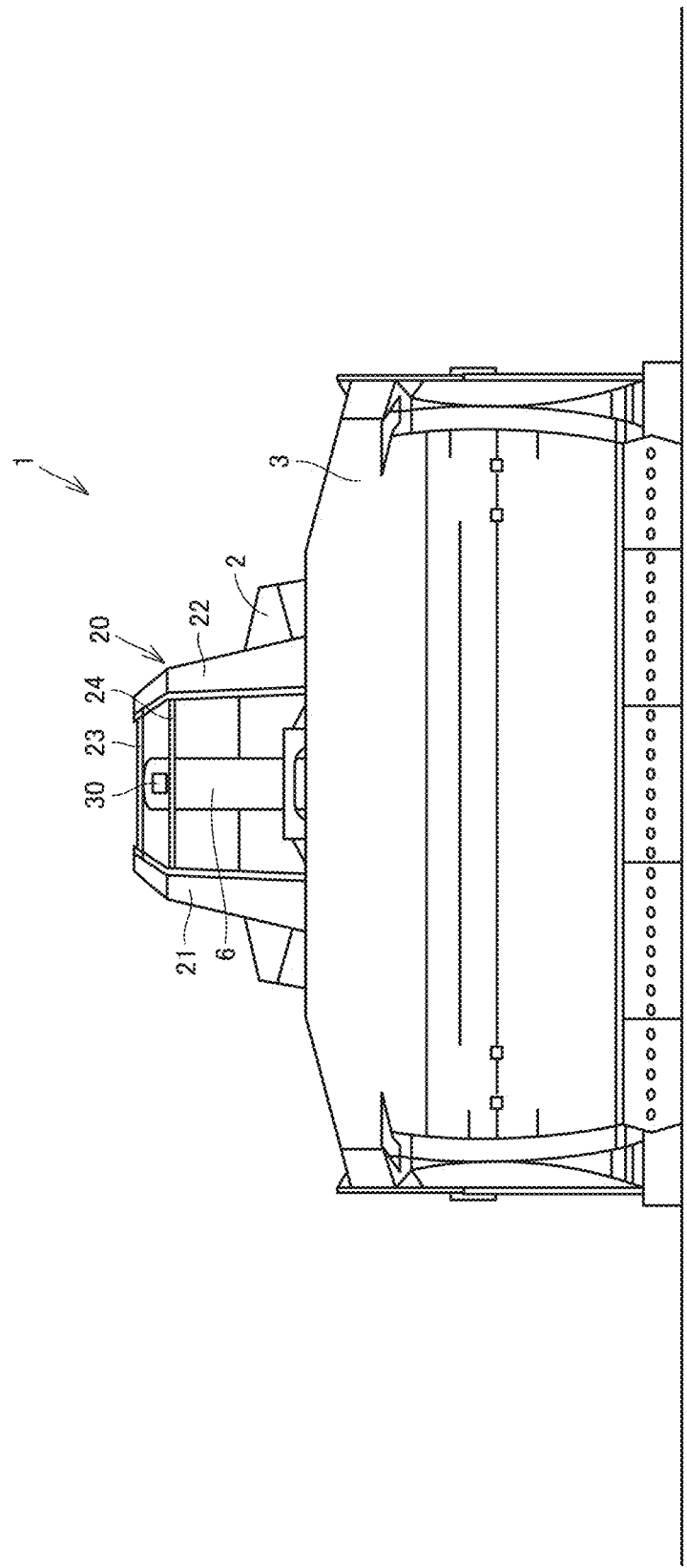
FIG. 2 is a front view of the crawler dozer shown in FIG. 1.
Figure 3:
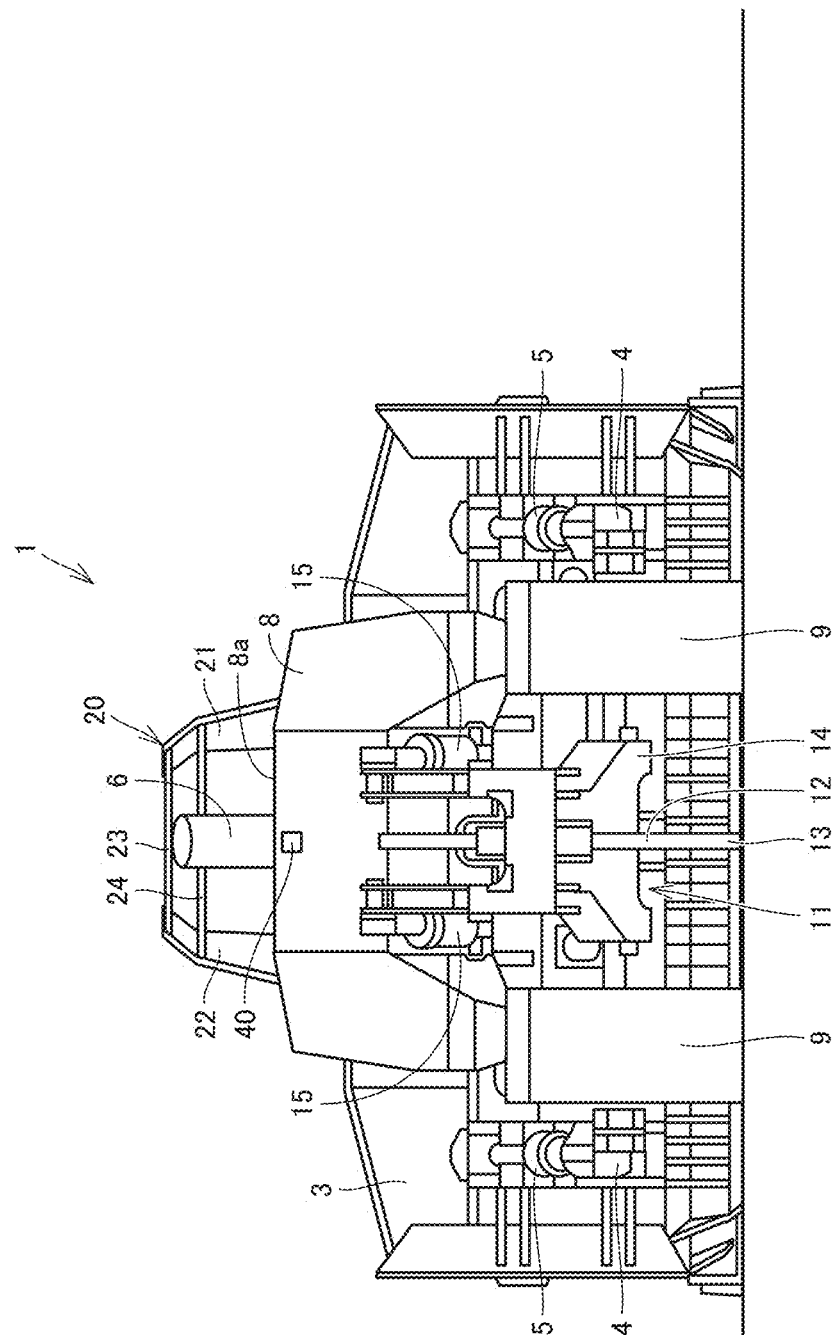
FIG. 3 is a rear view of the crawler dozer shown in FIG. 1.
Figure 4:
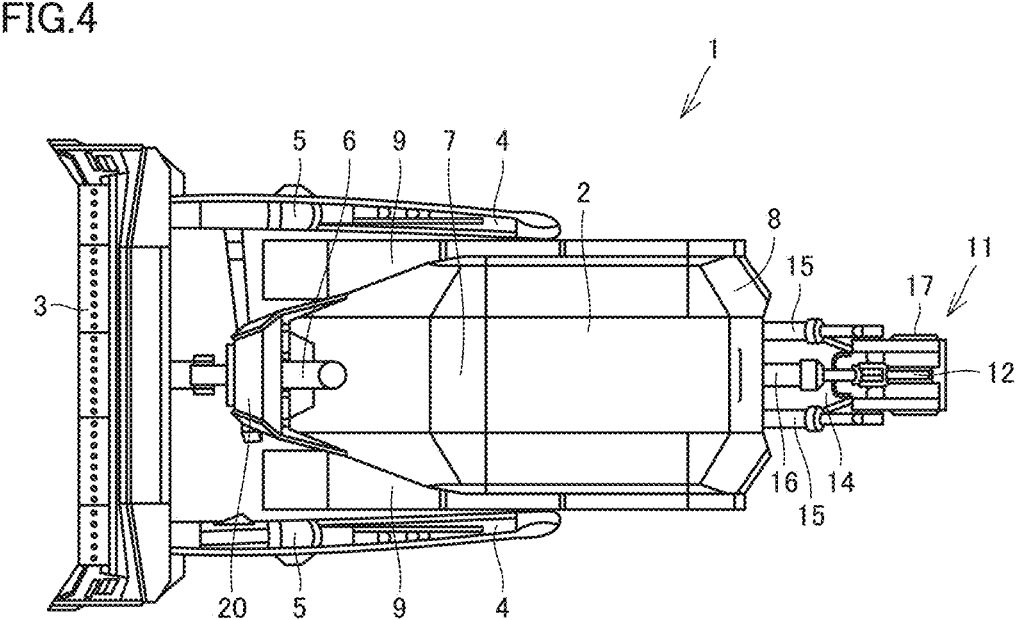
FIG. 4 is a plan view of the crawler dozer shown in FIG. 1.

FIG. 1 is a side view schematically showing a construction of a crawler dozer 1 in an embodiment of the present invention. FIG. 2 is a front view of crawler dozer 1 shown in FIG. 1. FIG. 3 is a rear view of crawler dozer 1 shown in FIG. 1. FIG. 4 is a plan view of crawler dozer 1 shown in FIG. 1. Crawler dozer 1 shown in FIGS. 1 to 4 is a work vehicle dedicated to remote control. Crawler dozer 1 is controlled by a radio signal from a remote control device. Crawler dozer 1 does not include an operator's compartment for allowing an operator to get thereinto and to operate such a vehicle. Crawler dozer 1 does not carry a control function to be used by the operator who gets thereinto.

As shown in FIG. 1, crawler dozer 1 includes a vehicle main body 2 and a travelling unit 18. Vehicle main body 2 is installed on travelling unit 18. As shown in FIG. 4, travelling unit 18 includes a pair of right and left crawler belts 9 separated in a vehicle width direction. Crawler belts 9 have an elliptical shape. Travelling unit 18 includes drive wheels 10. Crawler belts 9 are partially wound around outer circumferences of drive wheels 10. Crawler belts 9 are driven by rotation of drive wheels 10, and crawler dozer 1 travels.

Crawler dozer 1 includes an excavating blade 3 and a ripper apparatus 11. Excavating blade 3 is disposed at a front position of vehicle main body 2. Excavating blade 3 is a work implement for performing work such as soil excavation and land grading. Ripper apparatus 11 is disposed at a rear position of vehicle main body 2. Ripper apparatus 11 is a work implement for penetrating and crushing a hard material such as a rock.

Note that, in this embodiment, a direction in which crawler dozer 1 travels straight is referred to as a fore/aft direction of crawler dozer 1. In the fore/aft direction of crawler dozer 1, a side where excavating blade 3 protrudes from vehicle main body 2 is defined as a front direction. In the fore/aft direction of crawler dozer 1, a side where ripper apparatus 11 protrudes from vehicle main body 2 is defined as a rear direction. A left/right direction of crawler dozer 1 is a direction perpendicular to the fore/aft direction when viewed from above. A right side and a left side in the left/right direction when looking forward are a right direction and a left direction, respectively. A vertical direction of crawler dozer 1 is a direction perpendicular to a plane defined by the fore/aft direction and the left/right direction. A side on which the ground is present in the vertical direction is a lower side, and a side on which the sky is present is an upper side.

In crawler dozer 1, vehicle main body 2, which excludes excavating blade 3 as a front work implement; ripper apparatus 11 as a rear work implement, and travelling unit 18 as a track-type traveling apparatus, is formed into a shape that has no protrusion and is less likely to interfere with a periphery during work. An upper surface of vehicle main body 2 forms a substantially flat surface in the fore/aft direction and the left/right direction.

Excavating blade 3 is supported by frames 4 on both the left and right sides. Excavating blade 3 is driven by tilt cylinders 5 and a lift cylinder 6. Tilt cylinders 5 and lift cylinder 6 extend and contract in accordance with a command signal from a controller to be described later.

Excavating blade 3 is moved up and down by the extension and contraction of lift cylinder 6. A pitch angle of excavating blade 3 is changed by the extension and contraction of tilt cylinders 5. By changing the pitch angle, an inclination of excavating blade 3 with respect to the fore/aft direction changes. Note that the pitch angle of excavating blade 3 refers to an angle at which a cutting edge of excavating blade 3 is inclined with respect to a reference surface such as a perpendicular direction or a horizontal direction when crawler dozer 1 is viewed sideways.

Ripper apparatus 11 includes a shank 12. At a lower end of shank 12, a ripping tip 13 is provided. Ripping tip 13 penetrating a rock or the like, ripper apparatus 11 rips or crushes the rock by traction by travelling unit 18. Ripper apparatus 11 is driven by tilt cylinders 15 and a lift cylinder 16.

A ripper arm 14 is provided below tilt cylinders 15 and lift cylinder 16. One end of ripper arm 14 is rotatably attached to vehicle main body 2. To other end of ripper arm 14, a beam 17 is attached so as to be rotatable with respect to ripper arm 14. Shank 12 is rotatably provided about beam 17 with respect to ripper arm 14.

On a front side of vehicle main body 2, an engine compartment 7 is disposed. An internal combustion engine, which is a driving source of the vehicle, is disposed in engine compartment 7.

Power generated by the internal combustion engine is transmitted to drive wheels 10 via a drive train in vehicle main body 2. Crawler belts 9 are driven by rotation of drive wheels 10, and crawler dozer 1 travels. The power of the internal combustion engine is also transferred to a hydraulic pump. The hydraulic pump supplies pressurized oil to respective actuators such as: tilt cylinders 5 and lift cylinder 6, which drive excavating blade 3; and tilt cylinders 15 and lift cylinder 16, which drive ripper apparatus 11.

Antennae (not shown) are provided above engine compartment 7. The antennae include a communication antenna and a global navigation satellite system (GNSS) antenna. A communication device is also mounted on vehicle main body 2. The communication device includes the above-mentioned communication antenna and the controller. The communication antenna receives a command signal transmitted from a remote place. Based on the received command signal, the controller controls the internal combustion engine, the work implements (excavating blade 3 and ripper apparatus 11), travelling unit 18, and the like. The communication device also transmits a signal, which includes information of crawler dozer 1, to a remote place. Crawler dozer 1 includes a camera, a positioning device, and the like, which will be described later. The communication device transmits a video signal of an image of a periphery of crawler dozer 1, an information signal including position information of the vehicle and topography information, and the like to the remote place.

A fuel tank 8 is disposed on a rear side of vehicle main body 2. Fuel tank 8 stores therein fuel to be supplied to the internal combustion engine. Crawler dozer 1 does not include the operator's compartment for allowing the operator to get thereinto, and it is unnecessary to consider rearward visibility when the operator gets thereinto. Therefore, fuel tank 8 extends to the upper surface of vehicle main body 2 in the vertical direction. An upper surface 8a of fuel tank 8 composes the upper surface of vehicle main body 2. Thus, since a capacity of fuel tank 8 is increased, crawler dozer 1 is made capable of continuing the work for a longer time.

A horn 20 is provided at a front end of vehicle main body 2. As shown in FIGS. 2 and 3, horn 20 has a right column portion 21 and a left column portion 22. Right column portion 21 is disposed to right from a center in the left/right direction of vehicle main body 2, and extends in the substantially vertical direction. Left column portion 22 is disposed to left from the center in the left/right direction of vehicle main body 2, and extends in the substantially vertical direction.

Horn 20 includes a canopy 23 and a shelf portion 24. Canopy 23 and shelf portion 24 have a flat plate shape, and are disposed in parallel to each other with a space in the vertical direction. Canopy 23 is disposed above shelf portion 24. A longitudinal direction of canopy 23 and shelf portion 24 extends in the left/right direction. Right ends of canopy 23 and shelf portion 24 are connected to right column portion 21. Left ends of canopy 23 and shelf portion 24 are connected to left column portion 22.

A front camera 30 is mounted on an upper surface of shelf portion 24. Front camera 30 is disposed facing forward so as to be capable of capturing images in front of crawler dozer 1. Front camera 30 is disposed above an upper end of excavating blade 3. Front camera 30 is disposed at a center portion in the left/right direction of vehicle main body 2.

A rear camera 40 is attached to fuel tank 8 disposed at a rear end of vehicle main body 2. Rear camera 40 is disposed facing backward so as to be capable of capturing images behind crawler dozer 1. Rear camera 40 is disposed at a position of a rear surface of fuel tank 8, the position being close to upper surface 8a. Rear camera 40 is disposed above an upper end of ripper apparatus 11. Rear camera 40 is disposed at the center portion in the left/right direction of vehicle main body 2.

Figure 5:
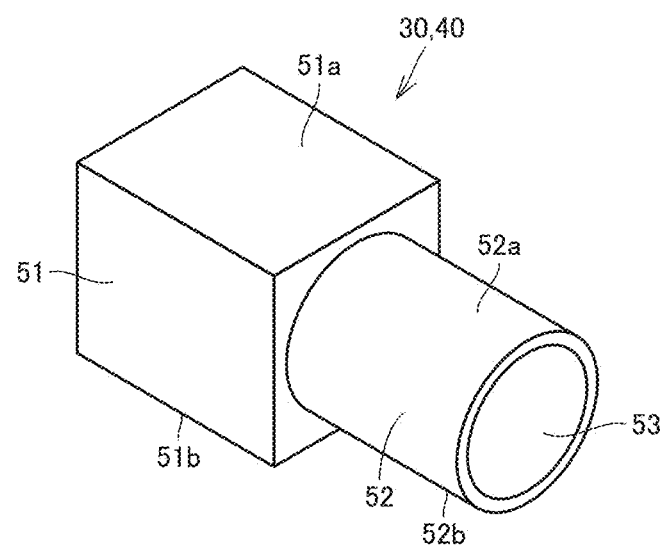
FIG. 5 is a perspective view schematically showing a construction of a camera mounted on the crawler dozer.

FIG. 5 is a perspective view schematically showing a construction of each of the cameras mounted on crawler dozer 1. In this embodiment, front camera 30 and rear camera 40 are provided as cameras with the same specifications. Each of the cameras includes a casing 51 having a box shape and a cylindrical portion 52 that has a cylindrical shape and protrudes from one surface of casing 51. A lens 53 is disposed at a tip of cylindrical portion 52. Casing 51 has an upper surface 51a and a lower surface 51b. Cylindrical portion 52 has an upper surface 52a and a lower surface 52b.

Figure 6:
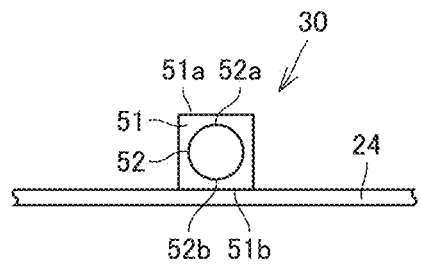
FIG. 6 is a schematic diagram showing a mounting situation of a front camera.

FIG. 6 is a schematic diagram showing a mounting appearance of front camera 30. As mentioned above, front camera 30 is mounted on shelf portion 24 of horn 20. Front camera 30 is disposed so that upper surface 51a of casing 51 faces upward, that lower surface 51b of casing 51 faces downward, that upper surface 52a of cylindrical portion 52 faces upward, and that lower surface 52b of cylindrical portion 52 faces downward.

Figure 7:
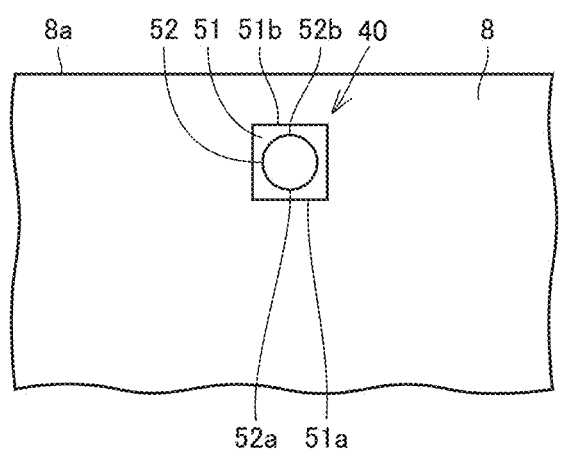
FIG. 7 is a schematic diagram showing a mounting situation of a rear camera.

FIG. 7 is a schematic diagram showing a mounting appearance of rear camera 40. As mentioned above, rear camera 40 is mounted near upper surface 8a of fuel tank 8. Rear camera 40 is disposed so that upper surface 51a of casing 51 faces downward, that lower surface 51b of casing 51 faces upward, that upper surface 52a of cylindrical portion 52 faces downward, and that lower surface 52b of cylindrical portion 52 faces upward.

In comparison between FIG. 6 and FIG. 7, rear camera 40 is attached to vehicle main body 2 in an upside-down direction. Front camera 30 is attached to vehicle main body 2 in an upside-up direction. Rear camera 40 is attached to vehicle main body 2 in a positional relationship opposite to that of front camera 30 in the vertical direction.

Front camera 30 and rear camera 40 need not be cameras having the same specifications. Each of front camera 30 and rear camera 40 may be cameras having arbitrary specifications. When both of front camera 30 and rear camera 40 include waterproof housings, each of which covers a part of the cylindrical portion, one of front camera 30 and rear camera 40 may be disposed so that the waterproof housing covers an upper portion of the cylindrical portion, and the other may be disposed so that the waterproof housing covers a lower portion of the cylindrical portion. When both of front camera 30 and rear camera 40 are dome cameras, one of front camera 30 and rear camera 40 may be disposed so as to be suspended from an attachment surface, and the other may be disposed so as to be mounted on the attachment surface.

Figure 8:
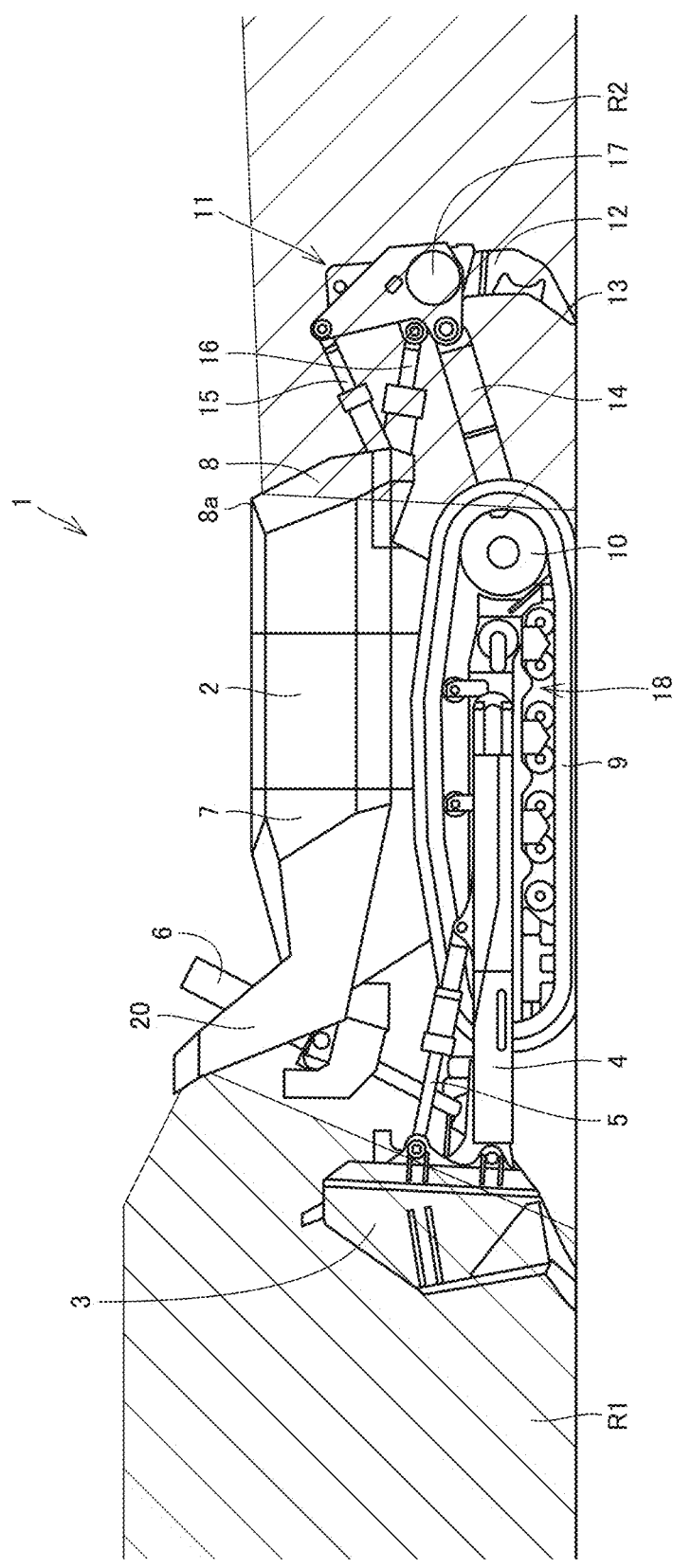
FIG. 8 is a schematic diagram showing imaging ranges by the front camera and the rear camera.

FIG. 8 is a schematic diagram showing an imaging range R1 by front camera 30 and an imaging range R2 by rear camera 40. In FIG. 8, hatching, which extends from upper right to lower left, is applied to imaging range R1 by front camera 30 when crawler dozer 1 is viewed from the side, and hatching, which extends from upper left to lower right, is applied to imaging range R2 by rear camera 40, and the applied hatchings are illustrated.

Imaging range R1 by front camera 30 includes: excavating blade 3 provided on the front side of crawler dozer 1; and a ground farther from vehicle main body 2 than excavating blade 3. Front camera 30 captures excavating blade 3 and the ground ahead of excavating blade 3, which are included in imaging range R1. Front camera 30 captures excavating blade 3, which composes a part of a front portion of crawler dozer 1, and a topography in front of crawler dozer 1. Front camera 30 has a function as a front imaging unit in this embodiment. The image captured by front camera 30 is referred to as a front image.

Imaging range R2 by rear camera 40 includes: fuel tank 8 at the rear end of vehicle main body 2; ripper apparatus 11 provided at the rear side of crawler dozer 1; and a ground farther from vehicle main body 2 than ripper apparatus 11. Rear camera 40 captures fuel tank 8, ripper apparatus 11, and the ground behind ripper apparatus 11, which are included in imaging range R2. Rear camera 40 captures fuel tank 8 and ripper apparatus 11, which compose a part of the rear portion of crawler dozer 1, and the topography behind crawler dozer 1. Rear camera 40 has a function as a rear imaging unit in this embodiment. The image captured by rear camera 40 is referred to as a rear image.

Figure 9:
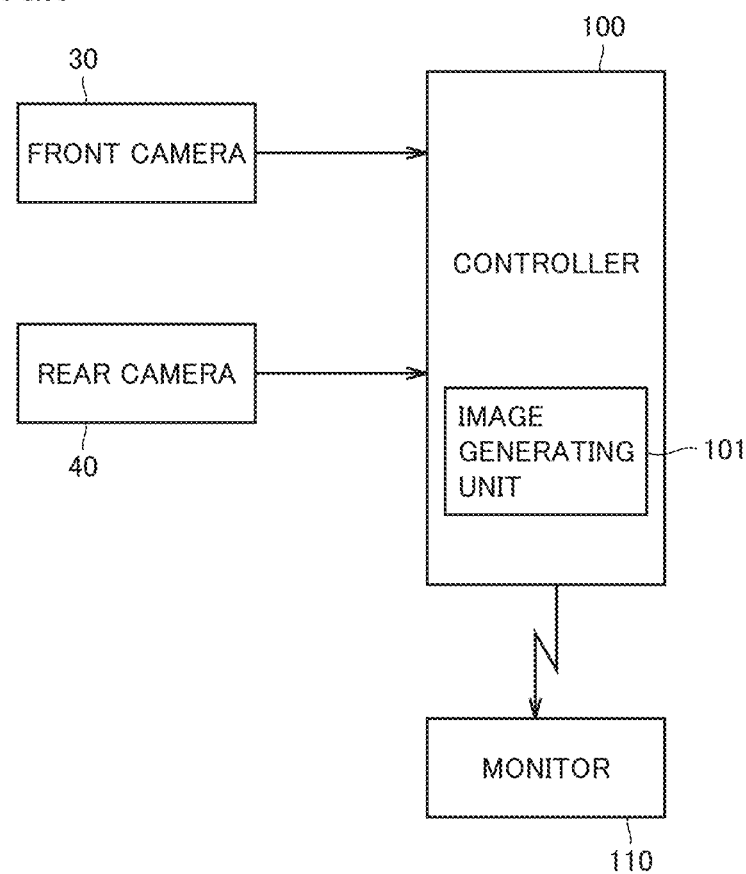
FIG. 9 is a functional block diagram schematically showing a construction of a display system.

FIG. 9 is a functional block diagram schematically showing a construction of a display system. As shown in FIG. 9, front camera 30 and rear camera 40 are electrically connected to a controller 100. Controller 100 is mounted on crawler dozer 1. Controller 100 composes the above-mentioned communication device, and controls the internal combustion engine, the work implements (excavating blade 3 and ripper apparatus 11), travelling unit 18, and the like.

Controller 100 includes an image generating unit 101. Image generating unit 101 generates a display image based on the front image captured by front camera 30 and the rear image captured by rear camera 40. Image generating unit 101 arranges the front image and the rear image next to each other, and generates the display image.

Controller 100 transmits the display image, which is generated by image generating unit 101, to a remote place by using the communication device mentioned above. The remote place is located at a location distant from a work site where crawler dozer 1 is working, and a monitor 110 is provided there. The display image generated by image generating unit 101 is displayed on monitor 110. The front image captured by front camera 30 and the rear image captured by rear camera 40 are displayed on one monitor 110. Monitor 110 has a function as a display unit in this embodiment, which displays a display image.

Figure 10:
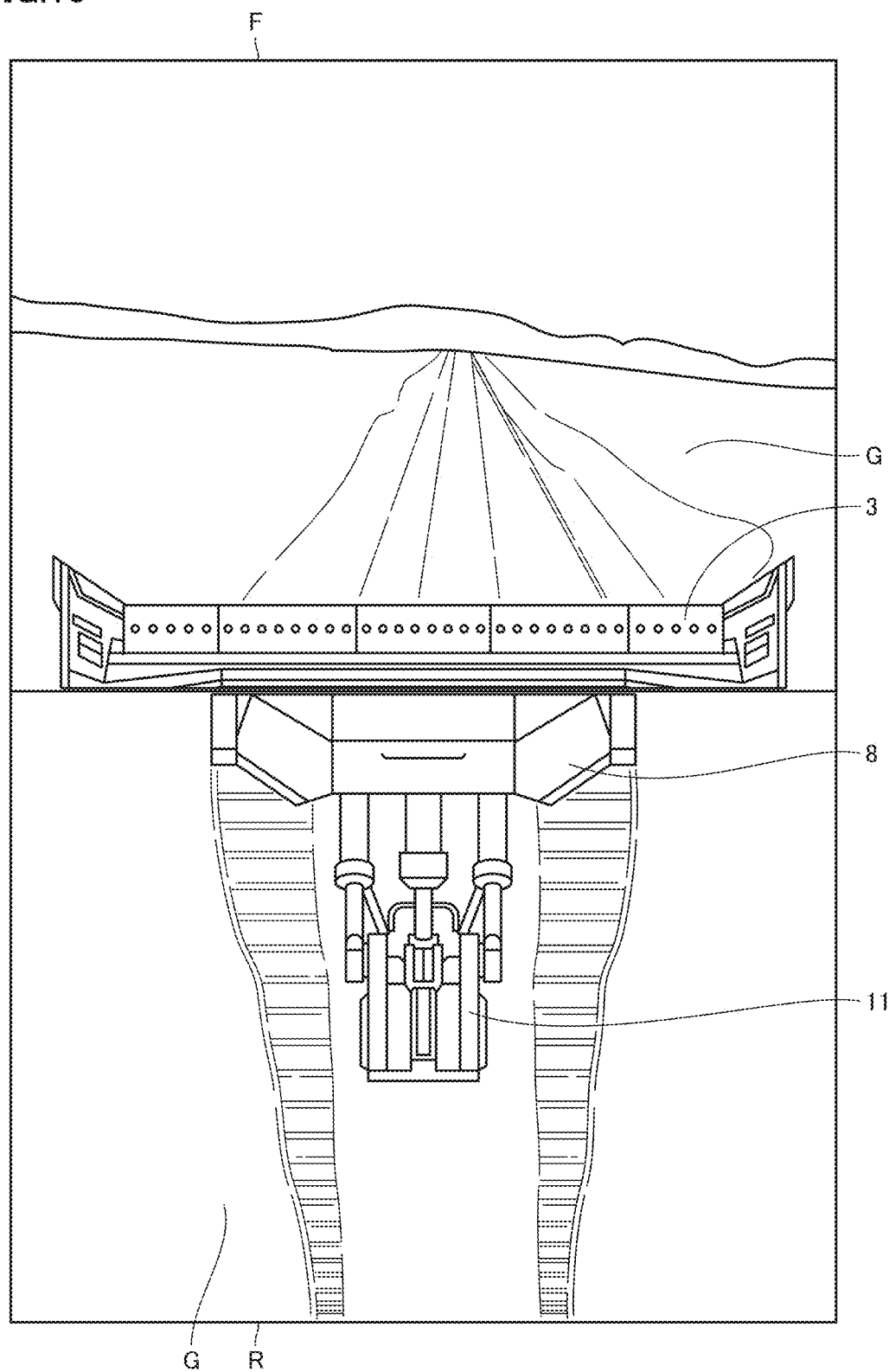
FIG. 10 is a schematic diagram showing an example of a display image displayed on a monitor.

FIG. 10 is a schematic diagram showing an example of the display image displayed on monitor 110. The display image shown in FIG. 10 includes a front image F and a rear image R. Both of front image F and rear image R are rectangular. Front image F and rear image R are arranged so that long sides of the respective rectangles overlap with each other. Front image F and rear image R are arranged adjacent to each other to constitute a display image having elongated rectangular shape in an up-and-down direction. Front image F and rear image R are arranged in the up-and-down direction of the display image. Front image F and rear image R are arranged in such a direction in which a long side of the display image extends. Front image F and rear image R are arranged in the up-and-down direction of the display image with front image F up and rear image R down.

Front image F includes excavating blade 3 and a ground G in front of crawler dozer 1. Rear image R includes fuel tank 8, ripper apparatus 11, and ground G behind crawler dozer 1. Front image F and rear image R are arranged such that excavating blade 3 in front image F and fuel tank 8 and ripper apparatus 11 in rear image R are adjacent to each other. Front image F and rear image R are arranged such that excavating blade 3 in front image F and fuel tank 8 and ripper apparatus 11 in rear image R face each other.

Excavating blade 3 is displayed at a position in contact with rear image R on a peripheral edge portion of front image F. Fuel tank 8 is displayed at a position in contact with front image F on a peripheral edge portion of rear image R. In the display image shown in FIG. 10, excavating blade 3 and fuel tank 8 are displayed as being connected to each other.

Of front image F and rear image R, rear image R on the lower side in the up-and-down direction of the display image is displayed upside-down. Rear image R is an upside-down normal image. Of front image F and rear image R, front image F on the upper side in the up-and-down direction of the display image is not displayed upside-down unlike rear image R. Front image F is an upside-up normal image. In front image F, a place far away from vehicle main body 2 is displayed on an upper edge portion of front image F, which is an opposite side to the side in contact with rear image R. In rear image R, a place far away from vehicle main body 2 is displayed on a lower edge portion of rear image R, which is an opposite side to the side in contact with front image F.

Excavating blade 3 displayed in front image F and fuel tank 8 and ripper apparatus 11, which are displayed in rear image R, are displayed at the same scale. Dimensional relationships among excavating blade 3, fuel tank 8 and ripper apparatus 11 when viewed from above, which are shown in FIG. 4, are kept similarly in a display image shown in FIG. 10 as well.

A function and effect of this embodiment will now be described.

As shown in FIGS. 2 and 3, the display system of this embodiment includes front camera 30 and rear camera 40. As shown in FIG. 8, front camera 30 captures excavating blade 3, which composes a part of the front portion of crawler dozer 1, and the topography in front of crawler dozer 1. Rear camera 40 captures fuel tank 8 and ripper apparatus 11, which compose a part of the rear portion of crawler dozer 1, and the topography behind crawler dozer 1.

As shown in FIG. 9, the display system also includes image generating unit 101 and monitor 110. Image generating unit 101 generates a display image. As shown in FIG. 10, the display image is generated by arranging front image F captured by front camera 30 and rear image R captured by rear camera 40 so that excavating blade 3 in front image R may face fuel tank 8 in rear image R. Monitor 110 displays the display image.

Front image F and rear image R are arranged while facing excavating blade 3 in front image R and fuel tank 8 in rear image R each other, whereby, in the display image, a direction in which the ground in front of crawler dozer 1 moves following the traveling of crawler dozer 1 and a direction in which the ground behind crawler dozer 1 moves following the traveling become the same direction. For example, when crawler dozer 1 moves forward, then in the display image shown in FIG. 10, ground G in front image F moves so as to flow from the top to the bottom, and ground G in rear image R also moves from the top to the bottom. Alternatively, when crawler dozer 1 moves backward, then in the display image shown in FIG. 10, ground G in rear image R moves so as to flow from the bottom to the top, and ground G in front image F also moves from the bottom to the top.

This makes it possible to display front image F and rear image R in the display image while giving a sense of unity thereto, so that it is easy for the operator who views monitor 110 to see the displayed image, and the operator can accurately grasp the traveling situation of crawler dozer 1 with ease. Hence, it is possible to remotely operate crawler dozer 1 with a sense close to that of a crawler dozer which the operator gets into.

Moreover, as shown in FIG. 10, front image F and rear image R are arranged in the up-and-down direction of the display image. In this way, when crawler dozer 1 moves forward or backward, the ground displayed on the display image moves up and down. Thus, the operator who views monitor 110 can see the displayed image with the same sense as a relative movement of the surrounding ground seen when the operator gets into the crawler dozer. Hence, it is easy for the operator to accurately grasp the traveling situation of crawler dozer 1.

Moreover, as shown in FIG. 10, of front image F and rear image R, which are arranged in the up-and-down direction of the display image, rear image R on the lower side in the up-and-down direction of the display image is an upside-down normal image. In this way, when crawler dozer 1 turns, excavating blade 3 (front end of the vehicle), which is displayed in front image F, and fuel tank 8 and ripper apparatus 11 (rear end of the vehicle), which are displayed in rear image R, move integrally. For example, when the vehicle turns left and moves backward, the rear end of the vehicle is displayed facing left in rear image R, and the front end of the vehicle is displayed facing right in front image F. When a steering lever of the vehicle is of a type in which the vehicle travels in a direction in which the lever is inclined, then the direction in which the lever is inclined and a traveling direction of the vehicle displayed in the display image coincide with each other. Hence, particularly during turning, it is easy for the operator to accurately grasp the traveling situation of crawler dozer 1.

Moreover, as shown in FIG. 10, front image F and rear image R are arranged in the up-and-down direction of the display image with front image F up and rear image R down. The operator who gets into the crawler dozer usually sits facing forward. The excavating blade, which composes a part of the front portion of the crawler dozer, and the topography in front of the crawler dozer enter the field of view of the operator sitting forward. Therefore, on the display image displayed on monitor 110, front image F and rear image R are arranged with front image F up and rear image R down, whereby the operator who views monitor 110 can see the displayed image with the same sense as the relative movement of the surrounding ground seen when the operator gets into the crawler dozer. Hence, it is easy for the operator to accurately grasp the traveling situation of crawler dozer 1.

As shown in FIG. 10, a scale of excavating blade 3 in front image F and a scale of fuel tank 8 and ripper apparatus 11 in rear image R are equal to each other. The front portion of crawler dozer 1, which is displayed in front image F, and the rear portion of crawler dozer 1, which is displayed in rear image R, are displayed at the same scale, whereby the operator who views monitor 110 can see both of front image F and rear image R without feeling strange. Hence, it is easy for the operator to accurately grasp the traveling situation of crawler dozer 1.

As shown in FIG. 10, front image F and rear image R are arranged adjacent to each other. Front image F and rear image R are arranged without a gap therebetween, thus making it possible to display front image F and rear image R in the display image while giving a sense of unity thereto.

As shown in FIGS. 1 to 4, crawler dozer 1 as an example of the work vehicle of this embodiment includes vehicle main body 2, front camera 30 and rear camera 40. Front camera 30 and rear camera 40 are mounted on vehicle main body 2. As shown in FIG. 8, front camera 30 captures excavating blade 3, which composes a part of the front portion of crawler dozer 1, and the topography in front of crawler dozer 1. Rear camera 40 captures fuel tank 8 and ripper apparatus 11, which compose a part of the rear portion of crawler dozer 1, and the topography behind crawler dozer 1. As shown in FIG. 7, rear camera 40 is attached to the vehicle main body in the upside-down direction. As shown in FIG. 6, front camera 30 is attached to the vehicle main body in the upside-up direction.

In this way, the image captured by rear camera 40 is turned upside-down, whereas the image captured by front camera 30 is not upside-down. The image captured by front camera 30 attached in the upside-up direction and the image captured by rear camera 40 attached upside-down are arranged, whereby the display image in which excavating blade 3 in front image R and fuel tank 8 in rear image R are arranged facing each other can be generated with ease.

In the description above, the example has been described, in which one of front camera 30 and rear camera 40 is attached to vehicle main body 2 upside-down, and the other thereof is attached to vehicle main body 2 in the upside-up direction. The display system and work vehicle of this embodiment are not limited to this example. For example, both of front camera 30 and rear camera 40 may be attached to vehicle main body 2 in the upside-up direction, and when image generating unit 101 of controller 100 generates the display image, one of front image F captured by front camera 30 and rear image R captured by rear camera 40 may be inverted vertically and horizontally to generate the display image. Alternatively, one of the images may be rotated by 180° to generate the display image.

In the display image, front image F and rear image R do not have to be arranged adjacent to each other. For example, a black screen area in which no image is displayed may be formed between front image F and rear image R. A bezel may be provided between front image F and rear image R.

A direction in which front image F and rear image R are arranged in the up-and-down direction of the display image may be such that front image F is on the lower side and rear image R is on the upper side. In a crawler dozer which the operator gets into, when performing ripping work using a ripper apparatus, the operator looks back and visually recognizes the situation of the ripping work. On the display image displayed on monitor 110, front image F and rear image R are arranged with rear image R up and front image F down, whereby the operator who views monitor 110 can see the displayed image with the same sense as the relative movement of the surrounding ground seen during the ripping work. Hence, it is easy for the operator to accurately grasp the situation of the ripping work.

The direction in which front image F and rear image R are arranged in the up-and-down direction of the display image may be switchable. When the crawler dozer moves forward, front image F and rear image R may be displayed on monitor 110 so as to be arranged with front image F up and rear image R down, and when the crawler dozer moves backward, front image F and rear image R may be displayed on monitor 110 so as to be arranged with rear image R up and front image F down.

Front image F and rear image R are not limited to the example of being arranged in the up-and-down direction of the display image, and may be arranged in the left/right direction of the display image.

Monitor 110 that displays the display image does not need to be located at a remote place away from the work site on which crawler dozer 1 is working. For example, in the crawler dozer including an operator's compartment which the operator gets into, monitor 110 of this embodiment may be disposed in the operator's compartment. The display system of this embodiment is not applied only to an unmanned work vehicle for remote control but may also be applied to a manned work vehicle operated by the operator who gets thereinto.

The present invention is not limited to the example in which front camera 30 and rear camera 40 are mounted on the work vehicle, and a camera provided on a flying object may capture an image, which includes a part of the work vehicle and the topography, from the sky.

Although the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST

1: crawler dozer, 2: vehicle main body, 3: excavating blade, 4: frame, 5, 15: tilt cylinder, 6, 16: lift cylinder, 7: engine compartment, 8: fuel tank, 8*a*, 51*a*, 52*a*: upper surface, 9: crawler belt, 10: drive wheel, 11: ripper apparatus, 12: shank, 13: ripping tip, 14: ripper arm, 17: beam, 18: travelling unit, 20: horn, 21: right column portion, 22: left column portion, 23: canopy, 24: shelf portion, 30: front camera, 40: rear camera, 51: casing, 51*b*, 52*b*: lower surface, 52: cylindrical portion, 53: lens, 100: controller, 101: image generating unit, 110: monitor, F: front image, G: ground, R: rear image, R1, R2: imaging range.

The invention claimed is:

1. A display system comprising:
a front imaging unit for capturing a front image including a front portion including an excavating blade of a crawler dozer and a topography in front of the crawler dozer;
a rear imaging unit for capturing a rear image including a rear portion of the crawler dozer and a topography behind the crawler dozer;
an image generating unit for generating a display image in which the front image captured by the front imaging unit and the rear image captured by the rear imaging unit are arranged adjacent to each other so that a peripheral edge portion of the front image and a peripheral edge portion of the rear image overlap with each other; and
a display unit for displaying the display image,
wherein, in the display image, (i) the front portion including the excavating blade of the crawler dozer captured by the front imaging unit in the front image contacts the rear image on the peripheral edge portion of the front image and (ii) the rear portion of the crawler dozer captured by the rear imaging unit in the rear image contacts the front image on the peripheral edge portion of the rear image.

2. The display system according to claim 1, wherein the front image and the rear image are adjacent to each other in an up-and-down direction of the display image.

3. The display system according to claim 2, wherein, of the front image and the rear image, which are adjacent to each other in the up-and-down direction of the display image, a lower image in the up-and-down direction of the display image is an upside-down normal image.

4. The display system according to claim 2, wherein the front image is above the rear image in the up-and-down direction of the display image.

5. The display system according to claim 1, wherein, in the display image, the front portion including the excavating blade of the crawler dozer captured by the front imaging unit in the front image and the rear portion of the crawler dozer captured by the rear imaging unit in the rear image are displayed at the same scale.

* * * * *